United States Patent [19]
Kim

[11] Patent Number: 6,057,720
[45] Date of Patent: May 2, 2000

[54] HIGH SPEED STICKY SIGNAL GENERATOR

[75] Inventor: Min Hwahn Kim, Kyoungki-do, Rep. of Korea

[73] Assignee: Hyundai Electronics Industries Co., Ltd., Ichon-shi, Rep. of Korea

[21] Appl. No.: 09/074,175

[22] Filed: May 7, 1998

[30]   Foreign Application Priority Data

May 8, 1997 [KR]   Rep. of Korea ........................ 97-17726

[51] Int. Cl.[7] .................................................. G06M 3/00
[52] U.S. Cl. .................................. 327/141; 377/2; 377/54; 377/76
[58] Field of Search .................................. 377/2, 54, 75, 377/76; 327/141

[56]   References Cited

U.S. PATENT DOCUMENTS

| 5,025,257 | 6/1991 | Hartley et al. | 341/101 |
| 5,153,848 | 10/1992 | Elkind et al. | 364/748 |
| 5,627,773 | 5/1997 | Wolrich et al. | 364/715.03 |

FOREIGN PATENT DOCUMENTS 3-67328   3/1991   Japan .

*Primary Examiner*—Margaret R. Wambach
*Attorney, Agent, or Firm*—Jacobson, Price, Holman & Stern, PLLC

[57]   ABSTRACT

The present invention has been made in view of the above mentioned problem, and the present invention provides a sticky signal generator for rapidly generating a sticky signal with a small layout area which uses a shift register of which the size is equal to the size of the inputted operand data. In accordance with the present invention, there is disclosed a sticky signal generator including: a plurality of shifters for shifting an input data by a shifting width in response to at least one of shifting width control signal, wherein the size of the shifters is equal to the size of the input data, and the plurality of shifters are coupled serially to each other; a plurality of selectors for selecting and outputting the bits which are discarded by the shifters during shifting operation in response to the at least one of shifting width control signal, wherein each input terminal of the plurality of selectors are coupled to each of corresponding shifters; and a detector for determining if a bit of predetermined logic level is included in at least one of outputs from the plurality of selectors, and outputting a sticky signal in case the bit of predetermined logic level is included in at least one of the outputs.

22 Claims, 2 Drawing Sheets

HIGH SPEED STICKY SIGNAL GENERATOR

BACKGROUND OF THE INVENTION

1. Field of the Invention

This invention relates to a floating point processor and more particularly to a sticky signal generator for generating a sticky signal in order to improve the reliability of operation of different-sized operands.

2. Description of the Related Art

Referring to the standard of Institute of Electrical and Electronics Engineers ("IEEE standard") on floating point processing, five exceptional processing events on floating point processing are defined in it. The five exceptional events include "Underflow" of operand data, "Overflow" of operand data, "Division by zero", "Data Inexactness" due to the data rounding and "Invalid Operation" which means that the operation is not defined.

According to the above mentioned IEEE tandard, in case one or more of the above five events happens during a certain operation being processed, just the fact that one or more of the exceptional events has happened is recorded in a predetermined flag and the operation keeps being processed.

Every system which includes floating point unit ("FPU") is recommended to follow IEEE standard No. 754 ("IEEE 754"), which is related to the floating point operation. For example, when an FPU is used in a microprocessor, a digital signal processor ("DSP"), or a microcontroller, etc., the IEEE 754 should be followed in order for the data compatibility.

Generally, in order to process floating point operands in an FPU, above all things, the numbers of bits of the operands are to be matched. In case the numbers of bits of the inputted operands are different, the two operands are called "different-sized". When two different-sized operands are used for a certain operation, the number of bits of one operand ("bigger operand") which has more number of bits than that of another operand ("smaller operand") is reduced to the number of bits of the smaller operand.

Conventionally, shift registers can be used to reduce the number of bits of the bigger operand. However, while reducing the number of bits of an operand by shift registers, several bits out of the shifted bits are discarded and if one or more of logic "1" bits are included the discarded bits, the result of the operation will be incorrect.

Therefore, in order to maintain the correctness of the operation of the different-sized operands, the information on the discarded logic "1" bits is set into a flag bit and the information is used to compensate the result of the operation during or after the process of the operation. A signal used to represent the information on the discarded logic "1" bits is called a "sticky signal".

Conventionally, if the number (e.g. integer "N") of bits of an operand is a multiple of 2 (two), a shift register of which the size is "2N" is needed to store the discarded bits. Otherwise, the number (e.g. integer "M") of bits of an operand is not a multiple of 2, a shift register of which the size is "M"+"K" is needed, where "K" is a multiple of 2 larger than "M". In other words, when an input operand data is not a multiple of 2, much larger size of shift register is needed.

For example, if the size of an input operand data is 64 bits which is a multiple of 2, the actual size of the operand becomes 68 bits including a Guard bit, a Round bit, a Sticky bit and an overflow bit which are specified in IEEE 754 for internal processing. So, a shift register of which the size is 128 bits is needed, so that the needed size of the shift register becomes 196 bits in total.

Therefore, the size of the shift register used in operation of two different-sized operands will be larger than the size of the operands, so that the shifting process will be slow. And, the slow shifting process results in decreasing the system performance. Further, the large size of the shift register makes the layout of the chip large and complex.

SUMMARY OF THE INVENTION

Therefore, the present invention has been made in view of the above mentioned problem, and the present invention provides a sticky signal generator for rapidly generating a sticky signal with a small layout area which uses a shift register of which the size is equal to the size of the inputted operand data.

In accordance with the present invention, there is disclosed a sticky signal generator including: a plurality of shifting means for shifting an input data by a shifting width in response to at least one of shifting width control signal, wherein the size of the shifting means is equal to the size of the input data, and the plurality of shifting means are coupled serially to each other; a plurality of selecting means for selecting and outputting the bits which are discarded by the shifting means during shifting operation in response to the at least one of shifting width control signal, wherein each input terminal of the plurality of selecting means are coupled to each of corresponding shifting means; and a detecting means for determining if a bit of predetermined logic level is included in at least one of outputs from the plurality of selecting means, and outputting a sticky signal in case the bit of predetermined logic level is included in at least one of the outputs.

BRIEF DESCRIPTION OF THE DRAWINGS

A further understanding of the nature and advantage of the present invention will become apparent by reference to the remaining portions of the specification and drawings.

DETAILED DESCRIPTION OF THE PREFERRED EMBODIMENT

A detailed description of an embodiment according to the present invention will be given below with reference to attached drawings.

A shift register of the present invention is configured to be of the size which is equal to the size of the inputted operands. The shift register of the present invention is used to match the sizes of the different-sized inputted operands. The bits which are discarded by this shift register is received by a multiplexer. And then the logic "1" bits out of the discarded bits are recollected by the multiplexer.

Therefore, the size of the shift register according to the present invention is equal to the size of the inputted operands whether they are multiples of 2 or not. The generation of the sticky signal by the sticky signal generator of the present invention is performed almost simultaneously with the shifting of the bigger operand, so that the overall processing is faster than the conventional sticky signal generator. Further, the sticky signal generator according to the present invention includes multiplexers for detecting the discarded logic "1" bits.

Figure 1:
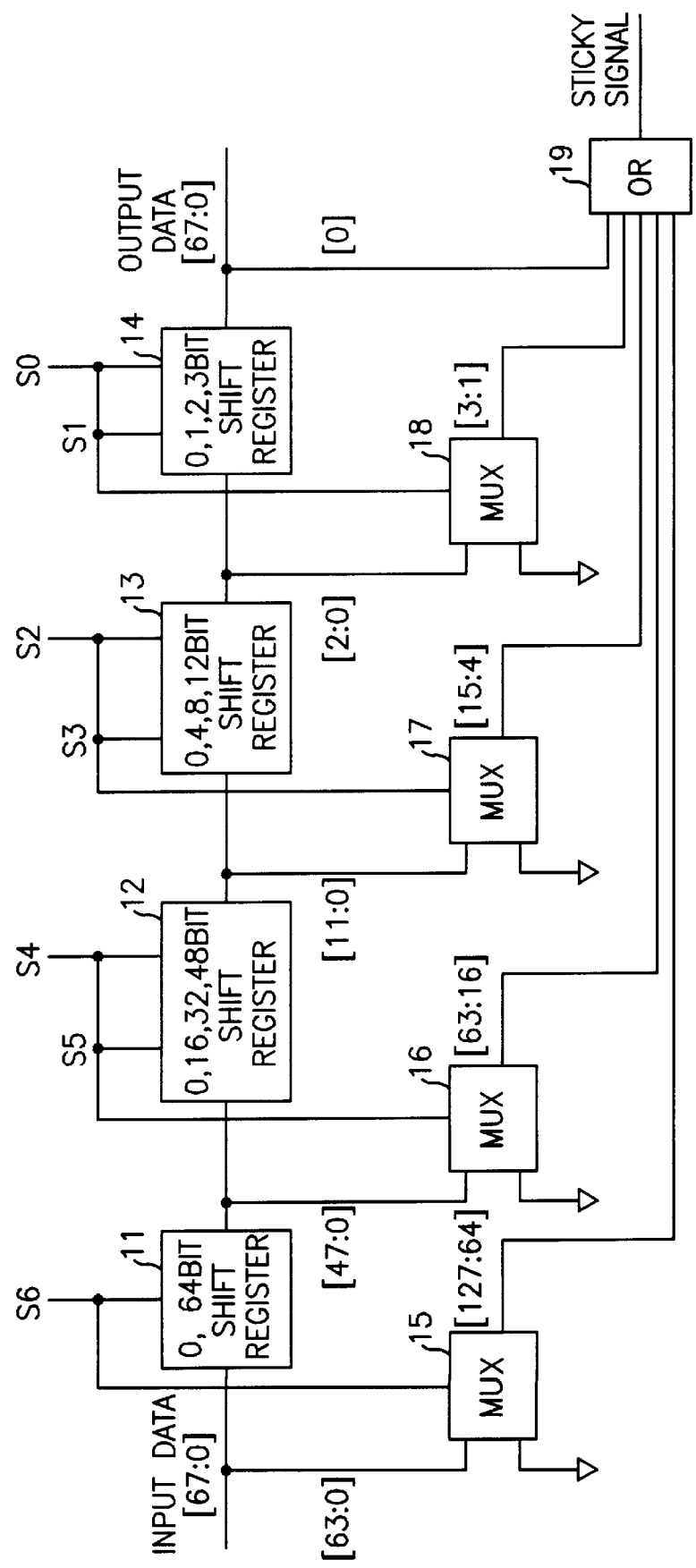
FIG. 1 is a schematic diagram of an embodiment of a sticky signal generator according to the present invention.

Now, referring to FIG. 1, FIG. 1 is a schematic diagram of an embodiment of a sticky signal generator 100 according to the present invention, which includes shift registers 11, 12, 13 and 14, multiplexers 15, 16, 17 and 18 and an OR gate 19.

For simplicity purpose only, an inputted operand of which the size is 68 bits is used to describe the idea of present invention.

In one embodiment of the present invention, as shown in FIG. 1, the sticky signal generator 100 includes serially connected 4 shift registers 11, 12, 13 and 14. The size of the shift register is 68 bits which is equal to the size of the inputted data [67:0]. The input terminal of each of the shift registers 11, 12, 13 and 14 is coupled to the input terminal of each of the multiplexers 15, 16, 17 and 18. The output terminals of the multiplexers 15, 16, 17 and 18 are coupled to the input terminals of the OR gate 19. The OR gate 19 may be replaced with a zero detector for detecting zero (0) signal.

Now, the operation of the sticky signal generator 100 is described in detail.

The 68 bits of input data [67:0] is inputted to the first shift register 11 for "0" or "64" bit shifting. In order for the first shift register to determine whether "0" bit shifting or "64" bit shifting is performed, the first shift register 11 is controlled by the most significant bit ("MSB") S6 of a control signal. In case the MSB S6 is "0", the input data [67:0] is not shifted ("0" bit shifting) and outputted to the second shift register 12. And if the MSB S6 is "1", the input data is shifted rightward by 64 bits ("64" bit shifting) and then outputted to the second shift register 12.

When the input data [67:0] is shifted by the shift register 11, the 64 bits out of 68 bits are discarded by the shift register 11.

The first multiplexer 15 receives the discarded 64 bits. In detail, one input terminal of the first multiplexer 15 is coupled to the input terminal of the first shift register 11 and receives 64 bits out of the 68 bits of input data [67:0], and another input terminal of the first multiplexer 15 receives logic "0" signal. The MSB S6 of the control signal is also inputted to the first multiplexer 15. Therefore, when the first shift register 11 does not perform the shifting operation (i.e. S6="0"), the first multiplexer 15 selects and outputs logic "0" signal. And when the first shift register 11 performs the shifting operation (i.e. S6="1"), the first multiplexer 15 selects the 64 bits [63:0] out of the input data and outputs them to the OR gate 19.

As described above, the 64 bits discarded by the first shift register 11 during the shifting operation are recollected by the first multiplexer 15. Further, since both of the shifting of the first shift register 11 and the recollecting of the first multiplexer 15 are controlled by one control signal S6 and performed almost simultaneously, the overall operation speed is very fast.

The output data of the first shift register 11 is inputted to the second shift register 12. A portion of the outputted data is also inputted to the second multiplexer 16 for recollecting. In this particular embodiment, 48 bits out of the outputted data are inputted to the second multiplexer 16.

The second shift register 12 is controlled by the second and the third bits "S5" and "S4" of the control signal. The amount of shifted bits are determined by the combination of the control bits "S5" and "S4". For example, the combination of the control bits "S5" and "S4" may be "0,0", "0,1", "1,0" or "1,1". In case it is "0,0", the inputted data will not be shifted. If it is "0,1", the inputted data will be shifted rightward by 16 bits, if it is "1,0", the inputted data will be shifted rightward by 32 bits, and if it is "1,1", the inputted data will be shifted rightward by 48 bits.

Hereinafter, the amount of shifted bits, i.e. 0 bit for "0,0", 16 bits for "0,1", 32 bits for "1,0" and 48 bits for "1,1" is called "shifting width", and the control bits S6, S5 and s4 of the control signal are called "shifting width control bits" or simply "control bits".

The second multiplexer 16 receives the shifting width control bits S5 and S4, and, in response to the control bits S5 and S4, the second multiplexer 16 recollects the data bits discarded by the shifting operation of the second shift register. In detail, if the combination of the control bits S5 and S4 is "0,0", the second multiplexer 16 selects logic "0" signal and outputs the selected logic "0" signal to the OR gate 19. If the combination of the control bits S5 and S4 is "0,1", 16 bits [15:0] out of the data outputted by the first shift register 11 is selected by the second multiplexer 16 and outputted to the OR gate 19.

In case the combination of the control bits S5 and S4 is "1,0", 32 bits [31:0] out of the data outputted by the first shift register 11 is selected by the second multiplexer 16 and outputted to the OR gate 19. Finally, if the combination of the control bits S5 and S4 is "1,1", 48 bits [47:0] out of the data outputted by the first shift register 11 is selected by the second multiplexer 16 and outputted to the OR gate 19.

Note here that while the first multiplexer 15 is designed to process 64 bits of data, it is enough for the second multiplexer 16 to be designed to process 48 bits of data.

As described above, for the first and the second shift registers 11 and 12 and multiplexers 15 and 16, the outputted data of the second shift register 12 is inputted to the third shift register 13 and a portion of the outputted data of the second shift register 12 is inputted to the third multiplexer 17 in order to recollect the data discarded by the shifting operation of the third shift register 13.

The third shift register 13 uses the fourth and the fifth bits S3 and S2 of the control signal as the shifting width control bits. In response to the control bits S3 and S2, the third shift register 13 shifts the input data rightward by the shifting width of 0 bit, 4 bits, 8 bits or 12 bits.

For example, if the combination of the control bits S3 and S2 is "0,0", the shifting width will be o bit. And, if "0,1", it will be 4 bits, if "1,0", it will be 8 bits and if "1,1", it will be 12 bits.

The third multiplexer 17 also uses the shifting width control bits S3 and S2 in order to recollect the discarded data bits. In other words, if the combination of the control bits S3 and S2 is "0,0", the third multiplexer 17 selects logic "0" signal and outputs the selected logic "0" signal to the OR gate 19. If the combination of the control bits S3 and S2 is "0,1", 4 bits out of the data outputted by the second shift register 12 is selected by the third multiplexer 17 and outputted to the OR gate 19. Further, if the combination of the control bits S3 and S2 is "1,0", 8 bits out of the data outputted by the second shift register 12 is selected by the third multiplexer 17 and outputted to the OR gate 19. Finally, if the combination of the control bits S3 and S2 is "1,1", 12 bits out of the data outputted by the second shift register 12 is selected by the third multiplexer 17 and outputted to the OR gate 19.

Much like the above mentioned process, the fourth shift register 14 uses least significant two bits S1 and S0 of the control signal as the shifting width control bits, and in response to the control bits S1 and S0, the fourth shift register 14 shifts the input data rightward by the shifting width of 0 bit, 1 bit, 2 bits or 3 bits. In detail, if the combination of the signals S1 and S0 is "0,0", the input data is not shifted. If "0,1", the input data is shifted rightward by 1 bit. Further, if "1,0", it is shifted rightward by 2 bits. Finally, if "1,1", it is shifted rightward by 3 bits.

The fourth multiplexer 18 also uses the shifting width control bits S1 and S0 in order to recollect the discarded data bits. In other words, if the combination of the control bits S1 and S0 is "0,0", the fourth multiplexer 18 selects logic "0" signal and outputs the selected logic "0" signal to the OR gate 19. If the combination of the control bits S1 and S0 is "0,1", 1 bits out of the data outputted by the third shift register 13 is selected by the fourth multiplexer 18 and outputted to the OR gate 19. Further, if the combination of the control bits S1 and S0 is "1,0", 2 bits out of the data outputted by the third shift register 13 is selected by the fourth multiplexer 18 and outputted to the OR gate 19. Finally, if the combination of the control bits S1 and S0 is "1,1", 3 bits out of the data outputted by the second shift register 12 is selected by the third multiplexer 17 and outputted to the OR gate 19.

The least significant bit ("LSB") data [0] out of the 68 bits of the output data from the fourth shift register 14 is used to make the sticky signal, so that it is received by the OR gate 19.

The OR gate 19 performs OR operation on the data from the four multiplexers 15, 16, 17 and 18 and the LSB [0] bit data from the fourth shift register 14 and determines if a logic "1" bit is included in these data. If it is included in them, a sticky signal is generated.

In case the zero detector (not shown) is used in place of the OR gate 19, the zero detector detects a logic "1" bits in the output data from the four multiplexers 15, 16, 17 and 18 and the LSB [0] bit data from the fourth shift register 14, and outputs the detection result as a sticky signal.

Figure 2:
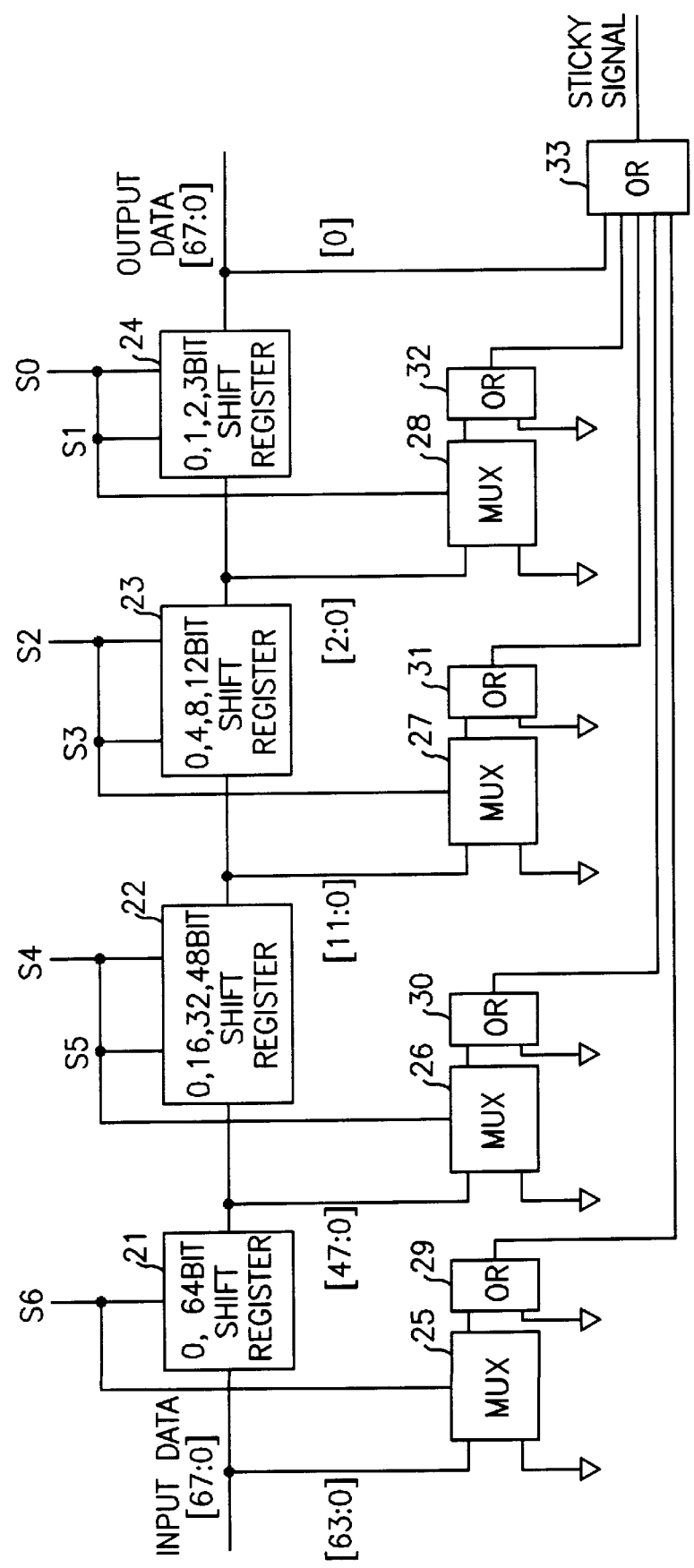
FIG. 2 is schematic diagram of another embodiment of a sticky signal generator according to the present invention.

FIG. 2 is schematic diagram of another embodiment of a sticky signal generator 200 according to the present invention, which includes shift registers 21, 22, 23 and 24, multiplexers 29, 30, 31 and 32 and OR gates 29, 30, 31, 32 and 33.

As shown in FIG. 2, the sticky signal generator 200 includes additional OR gates 29, 30, 31 and 32 on the output terminals of the multiplexers 29, 30, 31 and 32, respectively. The output terminals of the OR gates 29, 30, 31 and 32 are coupled to the input terminal of the OR gate 33.

The sticky signal generator 200 operates faster than the sticky signal generator 100 (refer to FIG. 1) because each of the additional OR gates 29, 30, 31 and 32 performs OR operation before the OR gate 33 performs OR operation so that the operating load on the OR gate 33 is reduced.

The detailed description on the operation of the sticky signal generator 200 is given below. For simplicity purpose only, the like operations by the like elements of the two embodiments are omitted.

The first OR gate 29 receives the data from the first multiplexer and a logic "0" signal. The first OR gate 29 determines if a logic "1" bit is included in the discarded bits while the first shift register 21 is shifting the input data in response to the shifting width control bit S6. The result of the determination of the first OR gate 29 is inputted to the fifth OR gate 33 which generates the sticky signal.

In the similar way, each of the second, the third and the fourth OR gate 30, 31 and 32 determines if a logic "1" bit is included in the discarded bits while each of the corresponding shift registers 22, 23 and 24 is shifting the input data by performing OR operation on the data from each of the corresponding multiplexers 26, 27 and 28 and a logic "0" signal. The result of the determination of each of the OR gates 30, 31 and 32 is inputted to the fifth OR gate 33.

The fifth OR gate 33 generates a sticky signal by performing OR operation on the data from the OR gates 29, 30, 31 and 32 and the LSB [0] bit from the fourth shift register 24.

Although the detailed description of the present invention is given by means of the shift registers which performs rightward shifting, the shift registers performing leftward shifting can be used instead. In this case, it is also possible to recollect the bits which is discarded by the shift register and to generate a sticky signal.

Although the detailed description of the present invention is given with an input data of which the size is 68 bits and the shift registers of the same size, it is apparent to one of ordinary skill in the art that the sticky signal generator of the present invention can be applicable to any size of input data and the size of the shift register used therein is configured to be equal to the size of the input data.

According to the present invention, a sticky signal which conforms IEEE 754 is quickly generated and, as a result, the FPU which uses the sticky signal can quickly operate floating point operation.

Although the preferred embodiment of the present invention has been disclosed for illustrative purposes, those skilled in the art will appreciate that various modifications, additions and substitutions are possible, without departing from the scope and the spirit of the present invention as disclosed in the accompanying claims.

What is claimed is:

1. A sticky signal generator comprising:
   a plurality of shifting means for shifting input data by a shifting width in response to at least one of a plurality of shifting width control signals, wherein the size of said plurality of shifting means is equal to the size of said input data, and said plurality of shifting means are coupled serially to each other;
   a plurality of selecting means for selecting and outputting bits which are discarded by said plurality of shifting means during shifting operation in response to said at least one of the plurality of shifting width control signals, wherein each input terminal of said plurality of selecting means is coupled to each of corresponding shifting means; and
   a detecting means for determining if a bit of a predetermined logic level is included in at least one of outputs from said plurality of selecting means, and outputting a sticky signal in case said bit of the predetermined logic level is included in at least one of said outputs.

2. A sticky signal generator as claimed in claim 1, wherein said detecting means includes an OR gate.

3. A sticky signal generator as claimed in claim 1, wherein said detecting means includes a zero signal detector.

4. A sticky signal generator as claimed in claim 1, wherein each of said plurality of shifting means includes an 68 bits shift register.

5. A sticky signal generator as claimed in claim 1, wherein each of said selecting means includes a multiplexer for receiving said discarded bits on one input terminal thereof and a logic "0" signal on another input terminal thereof, and selecting one of said inputs in response to at least one of said plurality of shifting width control signals.

6. A sticky signal generator as claimed in claim 2, wherein said OR gate outputs said sticky signal by performing OR operation of said outputs of said selecting means and a least significant bit outputted from a last shifting means among said plurality of shifting means which are serially connected.

7. A sticky signal generator as claimed in claim 4, wherein said plurality of shifting means include first, second, third and fourth shift registers, wherein said shift registers are serially coupled one after another and the size of one of said shift registers is 68 bits.

8. A sticky signal generator as claimed in claim 7, wherein said first shift register outputs said input data with 64 bit shifting or without shifting in response to a most significant bit of said plurality of shifting width control signals.

9. A sticky signal generator as claimed in claim 8, wherein said second shift register outputs said input data from said first shift register with 16, 32 or 48 bit shifting or without shifting in response to a second bit and a third bit of said plurality of shifting width control signals.

10. A sticky signal generator as claimed in claim 9, wherein said third shift register outputs said data from said second shift register with 4, 8 or 12 bit shifting or without shifting in response to a fourth bit and a fifth bit of said plurality of shifting width control signals.

11. A sticky signal generator as claimed in claim 10, wherein said fourth shift register outputs said data from said third shift register with 1, 2 or 3 bit shifting or without shifting in response to the least significant two (2) bits of said plurality of shifting width control signals.

12. A sticky signal generator comprising:
a plurality of shifting means for shifting input data by a shifting width in response to at least one of a plurality of shifting width control signals, wherein the size of said plurality of shifting means is equal to the size of said input data, and said plurality of shifting means are coupled serially to each other;
a plurality of selecting means for selecting and outputting bits which are discarded by said plurality of shifting means during shifting operation in response to said at least one of the plurality of shifting width control signals, wherein each input terminal of said plurality of selecting means is coupled to each of corresponding shifting means;
a detecting means for determining if a bit of a predetermined logic level is included in said outputs from said corresponding selecting means; and
a second detecting means for determining if a bit of the predetermined logic level is included in at least one of outputs from said plurality of first detecting means, and outputting a sticky signal in case said bit of the predetermined logic level is included in at least one of said outputs.

13. A sticky signal generator as claimed in claim 12, wherein said first or second detecting means includes an OR gate.

14. A sticky signal generator as claimed in claim 12, wherein said first or second detecting means includes a zero signal detector.

15. A sticky signal generator as claimed in claim 12, wherein each of said shifting means includes an 68 bits shift register.

16. A sticky signal generator as claimed in claim 12, wherein each of said selecting means includes a multiplexer for receiving said discarded bits on one input terminal thereof and a logic "0" signal on another input terminal thereof, and selecting one of said inputs in response to at least one of said plurality of shifting width control signals.

17. A sticky signal generator as claimed in claim 13, wherein said second detecting means outputs said sticky signal by performing OR operation of said outputs of said first detecting means and a least significant bit outputted from a last shifting means among said plurality of shifting means which are serially connected.

18. A sticky signal generator as claimed in claim 15, wherein said plurality of shifting means include first, second, third and fourth shift registers, wherein said shift registers are serially coupled one after another and the size of one of said shift registers is 68 bits.

19. A sticky signal generator as claimed in claim 18, wherein said first shift register outputs said input data with 64 bit shifting or without shifting in response to a most significant bit of said plurality of shifting width control signals.

20. A sticky signal generator as claimed in claim 19, wherein said second shift register outputs said input data from said first shift register with 16, 32 or 48 bit shifting or without shifting in response to a second bit and third bit of said plurality of shifting width control signals.

21. A sticky signal generator as claimed in claim 20, wherein said third shift register outputs said data from said second shift register with 4, 8 or 12 bit shifting or without shifting in response to a fourth bit and a fifth bit of said plurality of shifting width control signals.

22. A sticky signal generator as claimed in claim 21, wherein said fourth shift register outputs said data from said third shift register with 1, 2 or 3 bit shifting or without shifting in response to the least significant two (2) bits of said plurality of shifting width control signals.

* * * * *